(12) United States Patent
Zöllner et al.

(10) Patent No.: US 7,838,599 B2
(45) Date of Patent: Nov. 23, 2010

(54) BIMODAL ACRYLATE PSA FOR BONDING LOW-ENERGY AND ROUGH SURFACES

(75) Inventors: Stephan Zöllner, Buchholz/ Nordheide (DE); Nils Utesch, Hamburg (DE); Marc Husemann, Hamburg (DE)

(73) Assignee: tesa SE, Hamburg (DE)

( * ) Notice: Subject to any disclaimer, the term of this patent is extended or adjusted under 35 U.S.C. 154(b) by 553 days.

(21) Appl. No.: 11/782,761

(22) Filed: Jul. 25, 2007

(65) Prior Publication Data

US 2008/0027179 A1 Jan. 31, 2008

(30) Foreign Application Priority Data

Jul. 25, 2006 (DE) .................. 10 2006 034 893

(51) Int. Cl.
  *C08L 33/08* (2006.01)
(52) U.S. Cl. .................. 525/222; 526/317.1; 526/319; 526/320; 525/191
(58) Field of Classification Search .............. 526/317.1, 526/319, 320; 525/191, 222
See application file for complete search history.

(56) References Cited

U.S. PATENT DOCUMENTS

| 4,501,845 | A | * | 2/1985 | Baus et al. .................. 524/460 |
| 5,602,221 | A | | 2/1997 | Bennett et al. |
| 6,001,931 | A | * | 12/1999 | Brahm et al. ................ 525/123 |
| 2006/0052472 | A1 | | 3/2006 | Hansen et al. |
| 2006/0167181 | A1 | * | 7/2006 | Husemann et al. .......... 525/191 |

FOREIGN PATENT DOCUMENTS

| DE | 102 59 458 A1 | 7/2004 |
| DE | 10 2004 044 085 A1 | 3/2006 |
| EP | 0528304 A2 | 2/1993 |
| EP | 1634909 A | 3/2006 |
| WO | 2004056884 A | 7/2004 |

OTHER PUBLICATIONS

Bull. Jam. Phys. Soc. vol. 1, 1956, p. 123.
J.O. Metzger: Herstellung (Erzeugung) von Radiklaen durch homolytische Spaltung von C, H-Bindungen mit Radikalen; A. Herstellung, pp. 60-146.

* cited by examiner

*Primary Examiner*—Michael M Bernshteyn
(74) *Attorney, Agent, or Firm*—Norris McLaughlin & Marcus PA

(57) ABSTRACT

A Polyacrylate having an at least bimodal molecular weight distribution is disclosed. The polyacrylate is characterized by at least two maxima in the molar mass distribution curve, at points $M_1$ and $M_2$, with $M_1 > M_2$, in which, viewed formally, there are at least two polymers, $P_1$ and $P_2$, each having its own molecular weight distribution, the polymer $P_1$ possessing a most frequent molar mass $M_{max}(P_1)$ and the polymer $P_2$ possessing a most frequent molar mass $M_{max}(P_2)$, where $M_{max}(P_1) > M_{max}(P_2)$, at least the polymer $P_1$ being based on a monomer mixture comprising at least one monomer type selected from the group of the acrylic esters and of the methacrylic esters of the general formula $H_2C=CR^1-COOR^2$ where $R^1=H$ or $CH_3$ and where $R^2$ represents an aliphatic hydrocarbon chain having 4 to 15 carbon atoms; and at least one olefinically unsaturated monomer type containing functional groups, wherein the functional groups of the at least one olefinically unsaturated monomer type are groups which are able to react for a thermal crosslinking reaction, and at least the polymer $P_1$ has copolymerized monomers of the olefinically unsaturated monomer type containing groups that are reactive for a thermal crosslinking reaction, and is capable under the influence of thermal energy, where appropriate with addition of a catalyst, of entering into a crosslinking reaction.

6 Claims, No Drawings

BIMODAL ACRYLATE PSA FOR BONDING LOW-ENERGY AND ROUGH SURFACES

This application is a US utility application which claims priority to the German application DE 10 2006 034 893.1 filed Jul. 25, 2006.

The invention relates to polyacrylates having an at least bimodal molecular weight distribution, based on a monomer mixture comprising acrylic esters and methacrylic esters and also further olefinically unsaturated monomers, to a process for preparing such polyacrylates and also for preparing pressure-sensitive adhesives (PSAs) based on crosslinked polyacrylates of the aforementioned kind, and also to the corresponding PSAs per se.

The continually ongoing miniaturization in the field of electronics articles, as for example from the sectors of consumer electronics, telecommunications and automotive engineering, among others, is having consequences for all of the individual components of an end product and is imposing exacting requirements on the adhesive-tape applications as well. The logical consequence of the relatively low adhesive-tape thicknesses of below 20 μm that are required here in particular, and also of the minimized bonding areas, is the development of new PSAs which flow on well and adhere strongly. Accompanying this trend is the continually rising industrial demand for products featuring significantly improved adhesion and shear performance at elevated temperatures on substrates having a low surface energy (LSE). Substrates considered to be of low energy frequently have a surface energy of less than about 40 dyn/cm$^2$, or even of less than 35 dyn/cm$^2$. The materials which are distinguished by LSE surfaces include, among others, UV-curing paints, powder coatings, and also polyolefins such as polypropylene (PP), high-pressure polyethylene (LDPE), low-pressure polyethylene (HDPE), ultra-high molecular weight polyethylene (UHMWPE) and polymers of ethylene-propylene-diene monomer (EPDM). Materials that are considered particularly critical are those which combine a low surface energy with rough surfaces and, moreover, low levels of hardness, examples being Shore A hardnesses of less than 50, in many cases even of less than 40. Examples of these materials are open-celled foams of PE, EPDM, polyester or polyurethane. On account of the continually improving properties and the relatively low costs, these materials are being used to an ever-greater extent in industrial applications, as a result of which the demand for suitable PSA solutions is also growing. The development of adhesives is considered challenging, since the parameters of adhesion, tack and cohesion cannot be adjusted independently of one another. In particular, a combination of high peel resistance at room temperature and static shearing resistance at elevated temperatures is difficult to realize.

The challenge of developing a PSA for thin adhesive tapes for application to LSE substrates lies in the requirement to attain a profile of properties that combines immediate, high-level and uniform adhesion with a simultaneously high level of static shearing resistance at elevated temperatures.

Block copolymer adhesives have been presented for the purpose of improving the properties of PSAs. Using tackifiers, such block copolymer adhesives can generally be formulated to allow high peel resistances on LSE substrates. Generally speaking, however, block copolymer adhesives exhibit poor static shearing resistance at elevated temperatures. The rule set out above for adhesives is valid in the case of block copolymer adhesives as well: the higher the adhesion at room temperature, the lower the static shearing performance at elevated temperatures.

Acrylate PSAs can be formulated so as to provide a high level of static shearing resistance at elevated temperatures, but generally low peel adhesion on LSE surfaces. Tackified, acrylate-based adhesives, such as those set out in U.S. Pat. No. 5,602,221 (Bennett et al.), display improved adhesion on LSE substrates. Even these adhesives, however, fail to satisfy the requirements for static shearing performance at elevated temperatures, and they exhibit low adhesion properties on HDPE and possess a distinct acrylate odour.

PSAs having a bimodal molar mass distribution are known from other areas of requirements. DE 102 59 458 A describes a bimodal polyacrylate PSA which is prepared by means of a two-stage polymerization process and is based on a monomer mixture comprising (meth)acrylic esters and olefinically unsaturated comonomers. These PSAs are processed preferably from the melt. The low molecular mass fraction lowers the flow viscosity, while the high molecular mass fraction results in a high shear strength after appropriate crosslinking, preferably by means of actinic radiation, for the PSA.

For the profile of requirements presented in the context of the present specification, however, it is necessary to achieve further improvements in the cohesion properties of the PSAs and therefore to adapt the PSAs more effectively to the envisaged end use.

There therefore continues to be demand for a PSA composition which exhibits the combination of high room-temperature adhesion to LSE substrates and high elevated-temperature shear strength.

It is an object of the invention to avoid the advantages which exist in the prior art and to provide a pressure-sensitive adhesive (PSA) based on a polyacrylate. The intention in particular is to provide PSAs outstandingly suitable for adhesive bonding to apolar, low-energy and/or rough substrates.

The object is achieved by polyacrylates which can be modified by thermal crosslinking, by means of copolymerized, crosslinking-active comonomers, to give PSAs having a bimodal molecular weight distribution and the requisite requirements profile, and also by a polymerization process for preparing thermally crosslinking polyacrylates having a bimodal molecular weight distribution.

Accordingly it is possible to provide PSAs which as well as good adhesive properties also exhibit outstanding cohesion properties and are superior to the PSAs from the prior art.

An embodiment of the present invention relates, accordingly, to a polyacrylate
having an at least bimodal molecular weight distribution, characterized by at least two maxima in the molar mass distribution curve, at points $M_1$ and $M_2$, with $M_1 > M_2$,
in which, viewed formally, there are at least two polymers, $P_1$ and $P_2$, each having their own molecular weight distribution, the polymer $P_1$ possessing a most frequent molar mass $M_{max}(P_1)$ and the polymer $P_2$ possessing a most frequent molar mass $M_{max}(P_2)$, where $M_{max}(P_1) > M_{max}(P_2)$,
at least the polymer $P_1$ being based on a monomer mixture comprising
(a) at least one monomer type selected from the group of the acrylic esters and of the methacrylic esters of the general formula

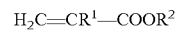

where $R^1$=H or $CH_3$ and where $R^2$ represents an aliphatic hydrocarbon chain having 4 to 15 carbon atoms;
(b) at least one olefinically unsaturated monomer type containing functional groups, where the functional groups of the at least one olefinically unsaturated monomer type are groups which are able to react for a thermal crosslinking reaction, and at least the polymer $P_1$ has copolymerized monomers of the olefinically unsaturated monomer type containing groups that are reactive for a thermal crosslinking reaction, and is capable under the influence of thermal energy, where appropriate with addition of a catalyst, of entering into a crosslinking reaction.

The first claim relates, accordingly, to a polyacrylate
having an at least bimodal molecular weight distribution, characterized by at least two maxima in the molar mass distribution curve, at points $M_1$ and $M_2$, with $M_1 > M_2$,
in which, viewed formally, there are at least two polymers, $P_1$ and $P_2$, each having their own molecular weight distribution, the polymer $P_1$ possessing a most frequent molar mass $M_{max}(P_1)$ and the polymer $P_2$ possessing a most frequent molar mass $M_{max}(P_2)$, where $M_{max}(P_1) > M_{max}(P_2)$,
at least the polymer $P_1$ being based on a monomer mixture comprising
(a) at least one monomer type selected from the group of the acrylic esters and of the methacrylic esters of the general formula $$H_2C=CR^1-COOR^2$$

where $R^1$=H or $CH_3$ and where $R^2$ represents an aliphatic hydrocarbon chain having 4 to 15 carbon atoms;
(b) at least one olefinically unsaturated monomer type containing functional groups, where the functional groups of the at least one olefinically unsaturated monomer type are groups which are able to react for a thermal crosslinking reaction, and at least the polymer $P_1$ has copolymerized monomers of the olefinically unsaturated monomer type containing groups that are reactive for a thermal crosslinking reaction, and is capable under the influence of thermal energy, where appropriate with addition of a catalyst, of entering into a crosslinking reaction.

In the context of the present specification the terms "molecular weight" and "molar mass" are used synonymously as mass per amount of substance.

By a broad bimodally distributed polyacrylate is meant in the context of this specification one wherein a polymer (addition polymer; molecular weight population) having a relatively low average molecular weight ($P_2$ hereinafter) and a polymer (addition polymer; molecular weight population) having a relatively high average molecular weight ($P_1$ hereinafter) are present alongside one another, in particular in a form such that the maxima of the two molecular weight distributions are at least 50 000 g/mol apart. This is characterized in that the polyacrylate in the molar mass distribution curve [a plot of the number of molecules of a fraction, i.e. the number of molecules having in each case the same molar mass (y-axis), against the molar masses that occur in the addition polymer (x-axis)] possesses two pronounced molecular peaks whose maxima in particular are at least 50 000 g/mol apart.

By the average molar masses $M_{max}(P_1)$ and $M_{max}(P_2)$ are meant the maxima of the distribution curves of the corresponding notionally free, i.e. unblended, polymers $P_1$ and $P_2$ ("most frequent molar mass"). Essentially, in other words disregarding the effect of the overlapping distribution curves in the mixture, the variable $M_{max}(P_1)$ corresponds to the variable $M_1$ and the variable $M_{max}(P_2)$ to the variable $M_2$. Taking into account the addition of the frequency of the corresponding molar masses that occur in both polymers in the region of overlap, there may be a shift in the maxima, so that $M_{max}(P_1)$ and $M_{max}(P_2)$ are not identical with $M_1$ and $M_2$, respectively.

Correspondingly, the weight-average molecular weights $M_w(P_1)$ of the polymer $P_1$ and $M_w(P_2)$ of the polymer $P_2$ are subject to the following relationship: $M_w(P_1) > M_w(P_2)$.

In a particularly preferred form the weight-average molecular weight of the polymer $P_1$, $M_w(P_1)$, is in the range from 800 000 g/mol to 2 000 000 g/mol, and the weight-average molecular weight of the polymer $P_2$, $M_w(P_2)$, is in the range from 50 000 to 250 000 g/mol. It has additionally emerged as being highly advantageous if the polydispersity of the polymer $P_1$, $D(P_1)=M_w(P_1)/M_n(P_1)$, is 4 to 15 and the polydispersity of the polymer $P_2$, $D(P_2)=M_w(P_2)/M_n(P_2)$, is 1.3 to 10, in particular to 7.

All molecular weight figures (in particular the most frequent molecular weight $M_{max}$, the weight-average molecular weight $M_w$, the number-average molecular weight $M_n$ and the polydispersity $D=M_w/M_n$) within this specification refer to the results from gel permeation chromatography (parameter cf. test D).

The thermal crosslinking reaction leads at least to the crosslinking of the polymer of higher molecular mass and hence to an increase in the cohesion of the polyacrylate. It is very advantageous to tie the low molecular mass polymer into the network as well.

Accordingly, both polymers, $P_1$ and $P_2$, are based advantageously on a monomer mixture of the specified composition.

In accordance with another embodiment of the present invention embraces a process for preparing a polyacrylate having at least bimodal molecular weight distribution, characterized by at least two maxima in the molar mass distribution curve, at points $M_1$ and $M_2$, with $M_1 > M_2$, wherein a monomer mixture comprising (a) at least one monomer type selected from the group of the acrylic esters and of the methacrylic esters of the general formula $$H_2C=CR^1-COOR^2$$

where $R^1$=H or $CH_3$ and where $R^2$ represents an aliphatic hydrocarbon chain having 4 to 15 carbon atoms;
(b) at least one monomer type which has groups that are reactive for a thermal crosslinking reaction with addition of initiator is polymerized in an at least two-phase free-radical polymerization, wherein s1) in the first reaction phase first a small amount of initiator is added to the monomer mixture and a first polymer $P_1$ is prepared, having a most frequent molar mass $M_{max}(P_1)$, and s2) before the complete reaction of the monomer mixture, by at least single deployment of a regulator, a next polymerization phase is initiated, wherein a second polymer $P_2$ is prepared, having a lower most frequent molar mass $M_{max}(P_2)$ so that $M_{max}(P_1) > M_{max}(P_2)$, and to give a polyacrylate having an at least bimodal molecular weight distribution, and wherein the polyacrylate in a further phase s3 (after the polymerization has run its course) is crosslinked by means of thermal energy.

In accordance with the invention a further claim embraces a process for preparing a polyacrylate having at least bimodal molecular weight distribution, characterized by at least two maxima in the molar mass distribution curve, at points $M_1$ and $M_2$, with $M_1 > M_2$, wherein a monomer mixture comprising (a) at least one monomer type selected from the group of the acrylic esters and of the methacrylic esters of the general formula

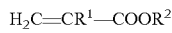
$$H_2C=CR^1—COOR^2$$

where $R^1$=H or $CH_3$ and where $R^2$ represents an aliphatic hydrocarbon chain having 4 to 15 carbon atoms;

(b) at least one monomer type which has groups that are reactive for a thermal crosslinking reaction with addition of initiator is polymerized in an at least two-phase free-radical polymerization, wherein s1) in the first reaction phase first a small amount of initiator is added to the monomer mixture and a first polymer $P_1$ is prepared, having a most frequent molar mass $M_{max}(P_1)$, and s2) before the complete reaction of the monomer mixture, by at least single deployment of a regulator, a next polymerization phase is initiated, wherein a second polymer $P_2$ is prepared, having a lower most frequent molar mass $M_{max}(P_2)$ so that $M_{max}(P_1) > M_{max}(P_2)$, and to give a polyacrylate having an at least bimodal molecular weight distribution, and wherein the polyacrylate in a further phase s3 (after the polymerization has run its course) is crosslinked by means of thermal energy.

Advantageously the process can be carried out in such a way that the polyacrylate, prior to the implementation of the crosslinking reaction, is a crosslinkable polyacrylate of the kind already presented above in accordance with the invention.

By repeating addition of one or more regulators prior to the crosslinking reaction it is possible to implement further polymerization phases in analogy to phase s2), in which case it is possible to prepare further polymers with further most frequent molar masses. In this way the process of the invention can be used to prepare polyacrylates having a multimodal distribution.

It has emerged as being advantageous for reinitiation to take place in the course of the process of the invention, in other words the subsequent metered addition of a further quantity of initiator, very preferably during or shortly after the addition of the regulator (phase s2 and further phases where appropriate).

The crosslinked polyacrylate can be used to outstanding effect as a pressure-sensitive adhesive (PSA), not least for the purpose stated in the object. To improve the properties of the PSA, in respect of precisely that use, among others—it is very advantageous if at least one tackifying resin is mixed into the polyacrylate (as described above and/or obtainable by the above process) prior to the thermal crosslinking, in particular with a weight fraction of up to 50% by weight, based on the polyacrylate.

Thermal Crosslinking Reagents

Monomer types in the sense of component (b) which have groups that are reactive for a thermal crosslinking reaction and which are able to react for a thermal crosslinking reaction are also referred to as copolymerizable thermal crosslinking reagents. The thermal crosslinking reaction may begin when a certain reaction temperature is reached, and where appropriate, and depending on the nature of the functional groups, it may also be necessary or advantageous to assist the thermal crosslinking reaction by adding corresponding catalysts.

The fraction of the copolymerizable crosslinking substance (component (b)) in the adhesive, in the case of two or more compounds (b) the fraction of the copolymerizable crosslinking substances in total, is advantageously at least 0.5% by weight, better still 1% by weight, preferably at least 1.5% by weight, more preferably still at least 2% by weight.

It is advantageous if the reactive groups are capable of being able to react with themselves. In this case it is sufficient for the crosslinking reaction for the monomer mixture to contain a single monomer type in the sense of component (b).

With advantage it is also possible to employ copolymerizable crosslinking reagents of the kind whose reactive group does not react during the polymerization but is able to react during the thermal crosslinking reaction with a further crosslinking reagent to be added to the composition; where appropriate, under the further action of a catalyst. Thus it is possible, for example, for a hydroxyl-containing polymer (through copolymerization of hydroxyl-containing comonomers as the copolymerizable thermal crosslinking reagent), following addition of diisocyanate, to bring about the thermal crosslinking.

In accordance with the invention it is also possible advantageously—instead of the one set out above or additionally—for there to be at least two olefinically unsaturated monomer types containing groups that are reactive for a thermal crosslinking reaction, the reactive groups of the one polymer type being able to react with the reactive groups of the second polymer type. This allows a crosslinking reaction to be controlled advantageously where appropriate. Here as well the addition of a catalyst may be advantageous.

The groups that are reactive for thermal crosslinking are to be selected in particular such that they do not react under the conditions of the polymerization, in other words behaving inertly.

Monomers which can be copolymerized outstandingly in the sense of the present invention and contain functional groups are, for example, hydroxyl-containing monomers; these monomers react in particular with epoxy groups, amide groups, and formaldehyde condensation products monomers containing epoxy groups; these monomers react in particular with acid groups, anhydride groups, and amino groups. As monomers containing epoxy groups it is possible by way of example and advantageously to use monomers containing glycidyl groups monomers containing amide groups, such as methylolacrylamide, methoxymethylacrylamide and isobutoxymethylacrylamide, for example, particularly for the purpose of reaction with epoxy groups, carboxyl groups and formaldehyde condensation products monomers containing isocyanate groups, for example isocyanatoethyl methacrylate, more particularly for the purpose of reaction with hydroxyl groups, acid groups, amino groups and thiols Mention may be made below, by way of example, of a number of compounds possessing outstanding suitability for use as copolymerizable thermal crosslinking reagents: β-acryloyloxypropionic acid, 2-(trimethylsiloxy)ethyl methacrylate, 2-hydroxyethyl acrylate, 2-hydroxyethyl methacrylate, 3-methacryloyloxypropyltris(trimethylsiloxy)silane, 4-hydroxybutyl acrylate, 4-vinylbenzoic acid, 6-hydroxyhexyl methacrylate, aconitic acid, acrylamidohydroxyacetic acid, allyl glycidyl ether, crotonic acid, acrylic acid, methacrylic acid, dimethylacrylic acid, fumaric acid, glycidyl acrylate, glycidyl methacrylate, hydroxypropyl acrylate, itaconic acid, N-methylolacrylamide, N-methylolmethacrylamide, trichloroacrylic acid, 2-acryloyloxypropyl phthalates ("Viscoat 2100"), butanediol monoacrylate, beta-carboxyethyl acrylate, polyethoxy methacrylate, glyceryl allyl ether, monoethyl maleate, isocyanatoethyl methacrylate.

The above listing should not be understood as being conclusive and is not intended to subject the inventive teaching to any unnecessary restriction.

As the monomer type that has groups that are reactive for a thermal crosslinking reaction it is possible with particular advantage to select glycidyl methacrylate for the process of the invention. This compound is also very advantageous in the sense of component (b), described earlier on above, for the polyacrylate still to be crosslinked, wherein the reactive groups are capable of being able to react with themselves. The glycidyl methacrylate may be copolymerized into the polymer or addition polymer $P_1$; it is particularly advantageous however, if the glycidyl methacrylate is being copolymerized not only into the polymer or addition polymer $P_1$ but also into the polymer or addition polymer $P_2$. The latter leads to a crosslinking reaction of the polymers or addition polymers within themselves and also with one another, and therefore leads to further improved cohesion of the PSA, without detrimental effect on its technical adhesive properties.

With preference in accordance with the invention it is possible for catalysts to be present that assist the thermal crosslinking reaction.

One possible, particularly advantageous procedure is when an amino methacrylate (e.g. dimethylaminoethyl methacrylate) is present as catalyst.

With further advantage it is possible as catalysts to use Lewis acids, examples being zinc salts or magnesium salts, boron trifluoride, the bromides of phosphorus and aluminium, the chlorides of boron, aluminium, phosphorus, antimony, arsenic, iron, zinc, and tin, and also superacids.

When glycidyl methacrylate is used it is very advantageous to employ acrylic acid as a further copolymerizable crosslinking reagent in the sense of component (b).

In a particularly advantageous procedure the fraction of glycidyl methacrylate is 1% to 3% by weight and the fraction of acrylic acid is 0.5% to 5%, in particular to 2% by weight.

Instead of glycidyl methacrylate or in addition to it it is also possible to use glycidyl acrylate as a self-crosslinking comonomer.

The invention further provides crosslinked polyacrylates and pressure-sensitive adhesives which are obtainable in accordance with at least one of the versions of the process of the invention.

The crosslinked PSA of the invention is especially suitable for use for adhesive bonding on non-polar substrates, particularly those having a surface energy of <35 dyn/cm².

The polyacrylate to be crosslinked, or the polyacrylate prepared in the process of the invention, will be described in more detail below, without any intention of unnecessary restriction. The remarks below therefore apply equally to the thermally crosslinkable polyacrylate of the invention and to onward development thereof (in the sense of Claims 1 to 6) and also to polyacrylate prepared in the process of the invention and its versions (Claims 7 to 11).

Polyacrylates

The polydispersity of the polyacrylates attains a value of at least 6, typically a value of 8, and in one particularly preferred embodiment is greater than 12. (The parameter stated here is the polydispersity over all of the polymer molecules, without taking into account the bimodality; in other words, not for components $P_1$ and $P_2$ separately. The polydispersity figures in Table 1 should be understood accordingly.)

The monomers of component (a) are acrylic and/or methacrylic esters having 4 to 15, with particular advantage 4 to 9, carbon atoms in the ester radical ($R^2$). The radical $R^2$ is an aliphatic hydrocarbon radical which in particular is saturated and linear or branched or else cyclic.

The monomers of component (a) are, in particular, plasticizing and/or non-polar monomers. Their composition in the monomer mixture is preferably selected such that the resultant polymers can be used, at room temperature or higher temperatures, as PSAs, in other words such that the resultant polymers possess pressure-sensitive adhesion properties.

In one very preferred way, monomers used for (a) are acrylic or methacrylic monomers which consist of acrylic and methacrylic esters having alkyl groups composed of 4 to 15 C atoms, preferably 4 to 9 C atoms. Examples of monomers which can be employed advantageously in accordance with the invention, without any intention that this listing should impose a restriction, are n-butyl acrylate, n-butyl methacrylate, n-pentyl acrylate, n-pentyl methacrylate, n-amyl acrylate, n-hexyl acrylate, hexyl methacrylate, 2-ethylbutyl methacrylate, n-heptyl acrylate, n-octyl acrylate, n-octyl methacrylate, n-nonyl acrylate, isobutyl acrylate, 2-ethylhexyl acrylate, 2-ethylhexyl methacrylate, isooctyl acrylate, isooctyl methacrylate.

The monomers of component (a) account advantageously for at least 50% by weight of the monomer mixture. The upper limit is a product of the difference in amount from the compounds of component (b) (see earlier on above) that are employed and, where appropriate, comonomers (c) employed further.

The monomer mixture may comprise further comonomers (c). These comonomers are selected such that they are copolymerizable with the monomers of component (a) and/or with the monomers of component (b), and may also serve to adjust the properties of the resultant PSA.

In principle it is possible as component (c) to use all compounds which have vinylic functionalization and which are copolymerizable with component (a) and/or component (b). Depending on the selection of the compounds of component (b), component (c) may also include compounds which despite having the capacity per se to function as thermal crosslinking reagents, in the presence of suitable reaction counterparts, nevertheless are unable to perform this function, owing to a lack of suitable reaction counterparts such as, for example, acrylic acid without the appropriate counterpart). These compounds may then be interpreted likewise as being monomers in the sense of component (c), so that assignment to group (b) is not in contradiction with assignment to group (c) in cases where the adhesive has a different composition.

By way of example and without wishing to impose any unnecessary restriction in the concept of the invention, mention may also be made below, for the monomers (c), of specific compounds which can be used to outstanding effect, individually or in combination with one another, as comonomers: 3,3,5-trimethylcyclohexyl acrylate, 3,5-dimethyladamantyl acrylate, 4-cumylphenyl methacrylate, behenyl acrylate, cyclohexyl methacrylate, cyclopentyl methacrylate, dodecyl methacrylate, ethyl acrylate, isobornyl acrylate, isobornyl methacrylate, isodecyl acrylate, lauryl acrylate, methyl acrylate, methyl methacrylate, n-undecyl acrylate, propyl methacrylate, stearyl acrylate, tert-butyl acrylate, tridecyl acrylate, cyanoethyl acrylate, cyanoethyl methacrylate, tetrahydrofurfuryl acrylate, trichloroacrylic acid, acrylonitrile, ethyl vinyl ether, vinyl acetate, vinyl chloride, vinylacetic acid, vinyl esters, vinyl ethers, vinylformamide, vinyl halides, vinylidene chloride, vinylidene halides, vinylpyridine, 4-vinylpyridine, N-vinylphthalimide, methylstyrene, 3,4-dimethoxystyrene, benzyl acrylate, benzyl methacrylate, phenyl acrylate, phenyl methacrylate, tert-butylphenyl acrylate, tert-butylphenyl methacrylate, p-biphenylyl acrylate, p-biphenylyl methacrylate, 2-naphthyl acrylate, 2-naphthyl methacrylate, diethylaminoethyl acrylate, diethylaminoethyl methacrylate, dimethylaminoethyl acrylate, dimethylaminoethyl methacrylate, dimethylaminopropylacrylamide, N-(n-butoxymethyl)acrylamide, dimethylaminopropyl methacrylamide, N-(1-methylundecyl)acrylamide, N-(butoxymethyl) methacrylamide, N-(ethoxymethyl)acrylamide, N-(n-octadecyl)acrylamide, and also N,N-dialkyl-substituted amides, such as, for example, N,N-dimethylacrylamide, N,N-dimethylmethacrylamide, N-benzylacrylamides, N-isopropylacrylamide, additionally N-methylolacrylamide, N-methylolmethacrylamide, N-tert-butylacrylamide, N-tert-octylacrylamide, N-vinyllactam, N-vinylpyrrolidone, 2-butoxyethyl acrylate, 2-butoxyethyl methacrylate, methyl 3-methoxyacrylate, 3-methoxybutyl acrylate, phenoxyethyl acrylate, phenoxyethyl methacrylate, 2-phenoxyethyl methacrylate, butyldiglycol methacrylate, ethylene glycol acrylate, ethylene glycol monomethacrylates, methoxy-polyethylene glycol methacrylate 350, methoxy-polyethylene glycol methacrylate 500, propylene glycol monomethacrylate, butoxydiethylene glycol methacrylate, ethoxytriethylene glycol methacrylate, octafluoropentyl acrylate, octafluoropentyl methacrylate, 2,2,2-trifluoroethyl methacrylate, 1,1,1,3,3,3-hexafluoroisopropyl acrylate, 1,1,1,3,3,3-hexafluoroisopropyl methacrylate, 2,2,3,3,3-pentafluoropropyl methacrylate, 2,2,3,4,4,4-hexafluorobutyl methacrylate, 2,2,3,3,4,4,4-heptafluorobutyl acrylate, 2,2,3,3,4,4,4-heptafluorobutyl methacrylate, 2,2,3, 3,4,4,5,5,6,6,7,7,8,8,8-pentadeca-fluorooctyl methacrylate.

Tackifying Resins

Advantageously the polyacrylates obtainable through the process of the invention are admixed, prior to thermal crosslinking, with at least one tackifying resin. As tackifying resins for addition it is possible to employ the known tackifying resins described in the literature. With preference it is possible to employ pinene resins, indene resins and rosins, their disproportionated, hydrogenated, polymerized and esterified derivatives and salts, the aliphatic and aromatic hydrocarbon resins, terpene resins and terpene-phenolic resins, and also C5 resins, C9 resins and other hydrocarbon resins. Combinations of these and further resins as well may be used with advantage in order to adjust the properties of the resultant adhesive in accordance with requirements. Generally speaking, it is possible to employ all resins that are compatible (soluble) with the corresponding polyacrylate, attention being drawn in particular to all aliphatic, aromatic and alkylaromatic hydrocarbon resins, hydrocarbon resins based on single monomers, hydrogenated hydrocarbon resins, functional hydrocarbon resins, and natural resins.

In one particularly preferred procedure terpene-phenolic resins and/or rosin esters are added.

The pressure-sensitive adhesives may be admixed optionally with plasticizers (plasticizing agents, such as phosphates, phthalates and citrates, for example), further fillers (such as organic and/or inorganic nanoparticles, fibres, carbon black, zinc oxide, chalk, solid or hollow glass beads, microbeads of other materials, silica, silicates, organic renewables such as wood flour, for example), nucleators, electrically conductive materials (such as conjugated polymers, doped conjugated polymers, metal pigments, metal particles, graphite, carbon nanotubes and fullerenes, for example), thermally conductive materials (such as boron nitrite, aluminium oxide and silicon carbide, for example), expandants, compounding agents and/or ageing inhibitors (in the form for example of primary and secondary antioxidants) and/or light stabilizers.

The thermal crosslinking of the polyacrylates may additionally be supported by crosslinking induced by means of actinic radiation. Furthermore, the polyacrylate may be admixed accordingly with crosslinkers and crosslinking promoters. Suitable crosslinkers for electron beam crosslinking and UV crosslinking, for example, are difunctional or polyfunctional acrylates.

The thermal crosslinking of the polyacrylates as brought about by means of copolymerizable crosslinking substances may be intensified, moreover, by means of added non-polymerizable, thermally activable crosslinkers, by means for example of difunctional or polyfunctional isocyanates (including those in blocked form) and/or difunctional or polyfunctional epoxides and/or, for example, Lewis acids and/or metal chelates.

For additional optional crosslinking with UV light, UV-absorbing photoinitiators may be added to and/or copolymerized in the PSAs. Useful photoinitiators which can be used to very good effect are benzoin ethers, such as benzoin methyl ether and benzoin isopropyl ether, substituted acetophenones, such as 2,2-diethoxyacetophenone, 2,2-dimethoxy-2-phenyl-1-phenylethanone and dimethoxyhydroxyacetophenone, substituted α-ketols, such as 2-methoxy-2-hydroxypropiophenone, aromatic sulphonyl chlorides, such as 2-naphthylsulphonyl chloride, and photoactive oximes, such as 1-phenyl-1,2-propanedione 2-(O-ethoxycarbonyl)oxime, for example. Examples of suitable copolymerizable photoinitiators are benzoin acrylate and acrylate-functionalized benzophenone derivatives.

Preparation Process for the Acrylate PSAs

In order to obtain a polymer glass transition temperature $T_g$ which is preferred for PSAs, viz. $T_g \leq 25°$ C., and in accordance with the remarks above, the monomers are very preferably selected, and the quantitative composition of the monomer mixture advantageously chosen, in such a way as to result in the desired $T_g$ value for the polymer in accordance with the equation (E1) in analogy to the Fox equation; cf. T. G. Fox, Bull. Am. Phys. Soc. 1 (1956)123).

$$\frac{1}{T_g} = \sum_n \frac{w_n}{T_{g,n}} \quad (E1)$$

In this equation n represents the serial number of the monomers used, $w_n$ represents the mass fraction of the respective monomer n (% by weight) and $T_{g,n}$ represents the respective glass transition temperature of the homopolymer of the respective monomer n, in K.

The polymerization can be carried out in polymerization reactors which in general are provided with a stirrer, two or more feed ports, reflux condenser, heating and cooling and are equipped for operation under $N_2$ atmosphere and superatmospheric pressure.

To prepare the (poly)methacrylate PSAs it is advantageous to carry out conventional free-radical polymerizations. For the polymerizations which proceed by a free-radical mechanism it is preferred to use initiator systems which in addition comprise further free-radical initiators for the polymerization, especially thermally decomposing free-radical-forming azo or peroxo initiators. In principle, however, any typical initiators familiar to the skilled person for acrylates are suitable. The production of C-centred radicals is described for example in Houben Weyl, Methoden der Organischen Chemie, Vol. E 19a, pp. 60-147. These methods are preferentially applied in analogy.

Examples of free-radical sources are peroxides, hydroperoxides and azo compounds; as certain, non-exclusive examples of typical free-radical initiators, mention may be made here of potassium peroxodisulphate, dibenzoyl peroxide, cumene hydroperoxide, cyclohexanone peroxide, di-tert-butyl peroxide, cyclohexylsulphonyl acetyl peroxide, diisopropyl percarbonate, tert-butyl peroctoate and benzpinacol. One very preferred procedure uses as its free-radical initiator 2,2'-azobis(2-methylbutyronitrile) (Vazo 67™ from DuPont) or azodiisobutyronitrile (AIBN).

For the preparation of the bimodal acrylate PSAs there are two processes that can be employed advantageously:

I) mixing two polyacrylates having different molecular weight compositions, particularly where the two polymerization peaks in the GPC differ by at least 50 000 g/mol;

II) free-radical polymerization process for preparing polyacrylates, using a regulator during the polymerization to prepare the bimodal acrylate PSA For I), in particular, two polyacrylates, $P_1$ and $P_2$, are polymerized that have a weight-average molecular weight $M_w$ in a range from 50 000 to 4 000 000 g/mol. The average molecular weight is determined by size exclusion chromatography (GPC). Polymers $P_1$ and $P_2$ are subject to the conditions already described; more particularly, the positions of the molecular weight peaks ($M_1$ and $M_2$) in the molar mass distribution curve differ by at least 50 000 g/mol.

The polymerization may be carried out in bulk, in the presence of one or more organic solvents, in the presence of water, or in mixtures of organic solvents and water. The aim is to minimize the amount of solvent used. Examples of suitable organic solvents include pure alkanes (e.g. hexane, heptane, octane, isooctane), aromatic hydrocarbons (e.g. benzene, toluene, xylene), esters (e.g. ethyl acetate, propyl, butyl or hexyl acetate), halogenated hydrocarbons (e.g. chlorobenzene), alkanols (e.g. methanol, ethanol, ethylene glycol, ethylene glycol monomethyl ether) and ethers (e.g. diethyl ether or dibutyl ether) or mixtures thereof. The aqueous polymerization reactions may be admixed with a water-miscible or hydrophilic cosolvent, in order to ensure that, in the course of monomer conversion, the reaction mixture is present in the form of a homogeneous phase. Cosolvents which can be used with advantage for the present invention are selected from the following group, consisting of aliphatic alcohols, glycols, ethers, glycol ethers, pyrrolidines, N-alkylpyrrolidinones, N-alkylpyrrolidones, polyethylene glycols, polypropylene glycols, amides, carboxylic acids and salts thereof, esters, organic sulphides, sulphoxides, sulphones, alcohol derivatives, hydroxyether derivatives, amino alcohols, ketones and the like, and also derivatives and mixtures thereof.

The polymerization time amounts to between 2 and 72 hours, depending on conversion and temperature. The higher the reaction temperature that can be selected, in other words the higher the thermal stability of the reaction mixture, the lower the level at which it is possible to select the reaction time.

The polymerization is initiated in particular by means of thermally decomposing initiators. The polymerization can be initiated by heating, at 50 to 100° C. for example, depending on initiator type.

For II) in one preferred embodiment of the process of the invention the selected molar ratio of initiator to monomer in the first phase (s1) is less than 0.005, with particular preference less than 0.003. The addition of initiator in the first phase may take place in one step or in two or more steps. Initiators used are, with particular preference, azobisisobutyronitrile (AIBN) or 2,2'-azobis(2-methylbutyronitrile) Vazo 67™ (DuPont).

In the second phase (s2) regulators are added to the polymerization in order to lower the molecular weight. In the second phase—and, where appropriate, in further polymerization phases—it is likewise possible for initiator to be added in one step or in two or more steps, in which case it is possible in particular to use the aforementioned initiators.

The procedure is in particular such that at least one of the phases (s1) and/or (s2), preferably the second phase (s2), is generated by means of a controlled free-radical polymerization.

In particular a procedure is adopted which involves adding, as polymerization regulators, alcohols, ethers, dithioethers, dithiocarbonates, trithiocarbonates, nitroxides, alkyl bromides, thiols, TEMPO (2,2,6,6-tetramethylpiperidine-1-oxyl) and TEMPO derivatives, for example. In a particularly preferred version of the process of the invention the regulators used are isopropanol, benzyl dithiobenzoate, ethyl dithioacetate, bis-2,2'-phenylethyl thiocarbonate or dibenzyl trithiocarbonate. The regulator is added preferably no earlier than after one hour of polymerization, but not later than 2 h before the end of reaction. The time at which the addition is made can be used to control the molecular weight distribution. The later the regulator is added, the smaller the low molecular mass fraction of the polyacrylate. The amount of regulator is guided by the efficiency, and at least 0.01 part by weight is used, based on the monomers. For the particularly preferred isopropanol regulator, between 3 and 30, more preferably between 5 and 25, parts by weight of isopropanol are used, based on the monomers.

In an alternative procedure the polymerization process for the controlled-growth free-radical polymerization by addition of regulating reagents can be selected from other known processes suitable for this purpose, of the kind set out, for example, in EP 1 361 260 B1, page 6, paragraph [0041] to page 8, paragraph [0048]. These regulators and processes as described therein are therefore explicitly incorporated into the disclosure content of the present specification.

Furthermore it may further be of advantage to increase the conversion by adding an initiator which possesses a crosslinking efficiency of greater than 5. Examples of such initiators include di(4-tert-butylcyclohexyl) peroxydicarbonate (e.g. Perkadox 16™ from Akzo Nobel).

Production of Adhesive Tapes

The PSA of the invention may be used with particular preference for the production of PSA tapes. As backing material, for adhesive tapes, for example, it is possible in this context to use the materials that are typical and familiar to the skilled person, such as films (polyesters, PET, PE, PP, BOPP, PVC), nonwovens, foams, woven fabrics and woven films, and papers, including release papers (glassine, HDPE, LDPE). This listing is not intended to be conclusive. It is possible in this way to produce single-sided, double-sided and transfer-type adhesive tapes.

For PSA coated from solution, the solvent is removed in a drying tunnel at elevated temperatures. A further possibility is to use the energy that has been introduced for the purpose of thermal crosslinking.

Use

The invention further provides for the use of a PSA comprising the polyacrylate of the invention for adhesive bonding on non-polar substrates. Non-polar substrates are characterized in particular by a surface energy of less than 35 dyn/cm². The materials which feature LSE (low surface energy) surfaces and can be bonded to outstanding effect by the PSAs of the invention include UV-curing paints, powder coatings, and also polyolefins such as polypropylene (PP), high-pressure polyethylene (LDPE), low-pressure polyethylene (HDPE), ultra-high molecular weight polyethylene (UHMWPE) and polymers of ethylene-propylene-diene monomer (EPDM). The PSA of the invention is also outstandingly suitable for bonding the materials considered particularly critical that have a low surface energy and/or a rough surface and, furthermore, have low shore A hardnesses of less than 50, typically less than 40. Examples of these materials are open-celled foams of polyethylene (PE), EPDM, polyester or polyurethane.

In one particularly advantageous implementation, high bond strength values are obtained immediately after adhesive bonding. The invention also, however, encompasses the use of the PSA where high bonding forces are realized after the complete attachment of the composition.

EXAMPLES

The exemplary experiments below are intended to illustrate the content of the invention without any intention that the choice of the examples should restrict the invention unnecessarily.

Test Methods

The polyacrylate compositions and their crosslinked products were characterized using the test methods described below.

Shear Strength (Test A)

A strip of the adhesive tape, 13 mm wide, was applied to a smooth, cleaned, vertically suspended steel surface. The area of application was 20 mm×13 mm (length×width). Then a 1 kg weight was affixed to the adhesive tape at room temperature, and the time taken for the adhesive tape to fall from the steel plate was recorded.

SAFT Test (Shear Adhesion Failure Temperature) (Test B)

This test serves for the accelerated testing of the shear strength of adhesive tapes under temperature load.

Sample preparation: The adhesive tape sample (PSA coated onto 50 µm PET film) is adhered to a steel test plate which has been sanded and cleaned with acetone, and which can be heated, and then is rolled on six times using a 2 kg steel roller at a speed of 10 m/min. The bond area of the sample in terms of height×width is 13 mm×10 mm; the sample is suspended vertically, protrudes beyond the top edge of the steel test plate by 2 mm, and is reinforced flush with a stable adhesive strip which serves as a support for the travel sensor.

Measurement: The sample for measurement is loaded at the bottom end with a 50 g weight. The steel test plate with the bonded sample is heated, starting at 25° C. and at a rate of 9° C. per minute, to the end temperature of 200° C. Using the travel sensor, the slip travel of the sample is measured as a function of temperature and time. The maximum slip travel is set at 1000 µm; if it is exceeded, the test is discontinued. Testing conditions: room temperature 23±3° C., relative humidity 50±5%.

Positive Result:
slip travel on reaching the end temperature (200° C.), reported in µm.

Negative Result:
temperature on reaching maximum slip travel (1000 µm), reported in ° C.

180° Bond Strength Test (Test C)

A 20 mm wide strip of an acrylate PSA coated onto polyester was applied to an HDPE (high-density polyethylene) plate which beforehand had been washed twice with acetone and once with isopropanol. The PSA strip was pressed onto the substrate ten times using a 4 kg weight. Immediately thereafter the tape was peeled from the substrate at 300 mm/min and at an angle of 180°.

The results are reported in N/cm and have been averaged from three measurements. All measurements were conducted at room temperature under standardized conditions.

Gel Permeation Chromatography (Test D)

The molecular weight determination (in particular the determination of the most frequent molecular weight $M_{max}$ and of the weight-average molecular weight $M_w$), and the determination of the polydispersity D, the molar mass distribution and the molar mass distribution curve, took place by means of gel permeation chromatography (GPC). The eluent used was THF (tetrahydrofuran) containing 0.1% by volume trifluoroacetic acid. Measurement was carried out at 25° C. The precolumn used was PSS-SDV, particle size 5 µm, porosity $10^3$ Å (0.1 µm), ID 8.0 mm×50 mm. Separation was carried out using the following columns: PSS-SDV, particle size 5 µm, porosity $10^3$ Å (0.1 µm) and also $10^5$ Å (10 µm) and $10^6$ Å (100 µm) each with ID 8.0 mm×300 mm. The sample concentration was 4 g/l and the flow rate was 1.0 ml per minute. Measurement took place against PMMA standards.

Samples Investigated

The samples used for the experiments were prepared as follows.

Reference 1

A 2 l glass reactor conventional for free-radical polymerizations was charged with 20 g of acrylic acid, 380 g of 2-ethylhexyl acrylate, 133 g of special-boiling-point spirit 69/95 and 133 g of acetone. After nitrogen gas had been passed through the reaction solution for 45 minutes, with stirring, the reactor was heated to 58° C. and 0.2 g of Vazo 67™ (DuPont) was added. Thereafter the external heating bath was heated to 75° C. and the reaction was carried out constantly at this external temperature. After a reaction time of 2.5 h dilution took place with 100 g of acetone. After a reaction time of 4 h a further 0.2 g of Vazo 67™ was added. After a polymerization time of 5 h dilution took place with 100 g of acetone, and after 6 h with 100 g of special-boiling-point spirit 60/95. After a reaction time of 24 h the polymerization was discontinued and the reaction vessel was cooled to room temperature. The polymer was analysed by test method D.

The polymer was subsequently blended with 37.5% by weight of Sylvares TP 95 (terpene-phenolic resin with a softening temperature of 95° C.) and 0.3% by weight of Al(acac)$_3$ [acac=acetylacetonate] (% by weight based in each case on the polymer) and the blend was applied from solution to a PET film, primed with Saran and 23 µm thick, and dried at 120° C. for 15 minutes. The coatweight after drying was 50 g/m$^2$.

Example 1a

A 2 l glass reactor conventional for free-radical polymerizations was charged with 20 g of acrylic acid, 380 g of 2-ethylhexyl acrylate, 67 g of special-boiling-point spirit 69/95, 67 g of acetone and 133 g of isopropanol. After nitrogen gas had been passed through the reaction solution for 45 minutes, with stirring, the reactor was heated to 58° C. and 0.2 g of Vazo 67™ (DuPont) was added. Thereafter the external heating bath was heated to 75° C. and the reaction was carried out constantly at this external temperature. After a reaction time of 4 h a further 0.2 g of Vazo 67™ was added. After a reaction time of 24 h the polymerization was discontinued and the reaction vessel was cooled to room temperature.

In a second free-radical polymerization a conventional 2 l glass reactor was charged with 20 g of acrylic acid, 380 g of 2-ethylhexyl acrylate, 133 g of special-boiling-point spirit 69/95 and 133 g of acetone. After nitrogen gas had been passed through the reaction solution for 45 minutes, with stirring, the reactor was heated to 58° C. and 0.2 g of Vazo 67™ (DuPont) was added. Thereafter the external heating bath was heated to 75° C. and the reaction was carried out constantly at this external temperature. After a reaction time of 2.5 h dilution took place with 100 g of acetone. After a reaction time of 4 h a further 0.2 g of Vazo 67™ was added. After a polymerization time of 5 h dilution took place with 100 g of acetone, and after 6 h with 100 g of special-boiling-point spirit 60/95. After a reaction time of 24 h the polymerization was discontinued and the reaction vessel was cooled to room temperature. Subsequently the two polymers were blended homogeneously with one another in a ratio of 1:1.

The polymer mixture was subsequently blended with 37.5% by weight of Sylvares TP 95 (terpene-phenolic resin with a softening temperature of 95° C.) and 0.3% by weight of Al(acac)$_3$ (% by weight based in each case on the polymer) and the blend was applied from solution to a PET film, primed with Saran and 23 μm thick, and dried at 120° C. for 15 minutes. The coatweight after drying was 50 g/m$^2$.

Example 1b

A 2 l glass reactor conventional for free-radical polymerizations was charged with 20 g of acrylic acid, 380 g of 2-ethylhexyl acrylate and 266 g of isopropanol. After nitrogen gas had been passed through the reaction solution for 45 minutes, with stirring, the reactor was heated to 58° C. and 0.2 g of Vazo 67™ (DuPont) was added. Thereafter the external heating bath was heated to 75° C. and the reaction was carried out constantly at this external temperature. After a reaction time of 4 h a further 0.2 g of Vazo 67™ was added. After a reaction time of 24 h the polymerization was discontinued and the reaction vessel was cooled to room temperature.

In a second free-radical polymerization a conventional 2 l glass reactor was charged with 20 g of acrylic acid, 380 g of 2-ethylhexyl acrylate, 133 g of special-boiling-point spirit 69/95 and 133 g of acetone. After nitrogen gas had been passed through the reaction solution for 45 minutes, with stirring, the reactor was heated to 58° C. and 0.2 g of Vazo 67™ (DuPont) was added. Thereafter the external heating bath was heated to 75° C. and the reaction was carried out constantly at this external temperature. After a reaction time of 2.5 h dilution took place with 100 g of acetone. After a reaction time of 4 h a further 0.2 g of Vazo 67™ was added. After a polymerization time of 5 h dilution took place with 100 g of acetone, and after 6 h with 100 g of special-boiling-point spirit 60/95. After a reaction time of 24 h the polymerization was discontinued and the reaction vessel was cooled to room temperature. Subsequently the two polymers were blended homogeneously with one another in a ratio of 1:1.

The polymer mixture was subsequently blended with 37.5% by weight of Sylvares TP 95 (terpene-phenolic resin with a softening temperature of 95° C.) and 0.3% by weight of Al(acac)$_3$ (% by weight based in each case on the polymer) and the blend was applied from solution to a PET film, primed with Saran and 23 μm thick, and dried at 120° C. for 15 minutes. The coatweight after drying was 50 g/m$^2$.

Example 1c

A 2 l glass reactor conventional for free-radical polymerizations was charged with 20 g of acrylic acid, 380 g of 2-ethylhexyl acrylate, 133 g of special-boiling-point spirit 69/95 and 133 g of acetone. After nitrogen gas had been passed through the reaction solution for 45 minutes, with stirring, the reactor was heated to 58° C. and 0.2 g of Vazo 67™ (DuPont) was added. Thereafter the external heating bath was heated to 75° C. and the reaction was carried out constantly at this external temperature. After a reaction time of one hour 60 g of isopropanol were added. After a reaction time of 2.5 h dilution took place with 100 g of acetone. After a reaction time of 4 h a further 0.2 g of Vazo 67™ (DuPont) was added. After a polymerization time of 7 h dilution took place with 100 g of special-boiling-point spirit 60/95, and after 22 h with 100 g of acetone. After a reaction time of 24 h the polymerization was discontinued and the reaction vessel was cooled to room temperature. The polymer was analysed by test method C.

The polymer was subsequently blended with 37.5% by weight of Sylvares TP 95 (terpene-phenolic resin with a softening temperature of 95° C.) and 0.3% by weight of Al(acac)$_3$ (% by weight based in each case on the polymer) and the blend was applied from solution to a PET film, primed with Saran and 23 μm thick, and dried at 120° C. for 15 minutes. The coatweight after drying was 50 g/m$^2$.

Example 1d

A 2 l glass reactor conventional for free-radical polymerizations was charged with 21.7 g of acrylic acid, 411.3 g of 2-ethylhexyl acrylate, 116.5 g of special-boiling-point spirit 60/95 and 116.5 g of acetone. After nitrogen gas had been passed through the reaction solution for 45 minutes, with stirring, the reactor was heated to 58° C. and 0.21 g of Vazo 67™ (DuPont) was added. Thereafter the external heating bath was heated to 75° C. and the reaction was carried out constantly at this external temperature. After a reaction time of 1 h a further 0.21 g of Vazo 67™ (DuPont) was added. After a reaction time of 1.5 h 0.013 g of bis(2,2'-phenylethyl trithiocarbonate was added. After a polymerization time of 7 h dilution took place with 50 g of special-boiling-point spirit 60/95, and after 22 h with 100 g of acetone. After a reaction time of 24 h the polymerization was discontinued and the reaction vessel was cooled to room temperature. The polymer was analysed by test method C.

The polymer was subsequently blended with 37.5% by weight of Sylvares TP 95 (terpene-phenolic resin with a softening temperature of 95° C.) and 0.3% by weight of Al(acac)$_3$ (% by weight based in each case on the polymer) and the blend was applied from solution to a PET film, primed with Saran and 23 μm thick, and dried at 120° C. for 15 minutes. The coatweight after drying was 50 g/m$^2$.

Reference 2

In a free-radical polymerization a conventional 200 l reactor was charged with 0.7 kg of acrylic acid, 33.95 kg of 2-ethylhexyl acrylate, 33.95 kg of butyl acrylate, 1.4 kg of glycidyl methacrylate and 23.35 kg of special-boiling-point spirit 60/95 and also 23.35 kg of acetone. After nitrogen gas had been passed through the reaction solution for 45 minutes, with stirring, the reactor was heated to 58° C. and 0.07 kg of Vazo 67™ (DuPont) in solution in 0.35 kg of acetone was added. Thereafter the external heating bath was heated to 75° C. and the reaction was carried out constantly at this external temperature. After a reaction time of 1 h 0.07 kg of Vazo 67™ (DuPont) in solution in 0.35 kg of acetone was added. After a reaction time of 2.5 h 0.091 kg of dicyclohexyl peroxydicarbonate (Perkadox 16®, Akzo Nobel) was added. After a reaction time of 3.5 h 10.50 kg of special-boiling-point spirit 60/95 were added as a diluent. Further dilution took place after 7.5 h by means of the addition of 10.5 kg of special-boiling-point spirit 60/95. After a reaction time of 24 h the polymerization was discontinued and the reaction vessel was cooled to room temperature. The polymer was analysed by test method C.

Subsequently the polymer was blended with 37.5% by weight of Sylvares TP 95 (terepene-phenolic resin with a softening temperature of 95° C.) and 0.3% by weight of $ZnCl_2$ (% by weight based in each case on the polymer) and the blend was applied from solution to a PET film which had been primed with Saran and was 23 μm thick, and dried at 120° C. for 15 minutes. The coatweight after drying was 50 g/m².

Example 2a

A 200 l glass reactor conventional for free-radical polymerizations was charged with 0.7 kg of acrylic acid, 33.95 kg of 2-ethylhexyl acrylate, 33.95 kg of butyl acrylate, 1.4 kg of glycidyl methacrylate and 23.35 kg of special-boiling-point spirit 60/95 and also 23.35 kg of isopropanol. After nitrogen gas had been passed through the reaction solution for 45 minutes, with stirring, the reactor was heated to 58° C. and 0.07 kg of Vazo 67™ (DuPont) in solution in 0.35 kg of acetone was added. Thereafter the external heating bath was heated to 75° C. and the reaction was carried out constantly at this external temperature. After a reaction time of 1 h 0.07 kg of Vazo 67™ (DuPont) in solution in 0.35 kg of acetone was added. After a reaction time of 2.5 h 0.091 kg of dicyclohexyl peroxydicarbonate (Perkadox 16®, Akzo Nobel) was added. After a reaction time of 24 h the polymerization was discontinued and the reaction vessel was cooled to room temperature. The polymer was analysed by test method C.

In a second free-radical polymerization a conventional 200 l reactor was charged with 0.7 kg of acrylic acid, 33.95 kg of 2-ethylhexyl acrylate, 33.95 kg of butyl acrylate, 1.4 kg of glycidyl methacrylate, 23.35 kg of special-boiling-point spirit 60/95 and 23.35 kg of acetone. After nitrogen gas had been passed through the reaction solution for 45 minutes, with stirring, the reactor was heated to 58° C. and 0.07 kg of Vazo 67™ (DuPont) in solution in 0.35 kg of acetone was added. Thereafter the external heating bath was heated to 75° C. and the reaction was carried out constantly at this external temperature. After a reaction time of 1 h 0.07 kg of Vazo 67™ (DuPont) in solution and 0.35 kg of acetone was added. After a reaction time of 2.5 h 0.091 kg of dicyclohexyl peroxydicarbonate (Perkadox 16®, Akzo Nobel) was added. After a reaction time of 3.5 h 10.50 kg of special-boiling-point spirit 60/95 were added for dilution. Further dilution took place after 7.5 h by means of the addition of 10.50 kg of special-boiling-point spirit 60/95. After a reaction time of 24 h the polymerization was discontinued and the reaction vessel was cooled to room temperature. Subsequently the two polymers were blended homogeneously with one another in a ratio of 2:3. The polymer mixture was analysed by test method C.

The polymer mixture was subsequently blended with 37.5% by weight of Sylvares TP 95 (terpene-phenolic resin with a softening temperature of 95° C.) and 0.3% by weight of $ZnCl_2$ (% by weight based in each case on the polymer) and the blend was applied from solution to a PET film, primed with Saran and 23 μm thick, and dried at 120° C. for 15 minutes. The coatweight after drying was 50 g/m².

Example 2b

A 200 l glass reactor conventional for free-radical polymerizations was charged with 0.7 kg of acrylic acid, 33.95 kg of 2-ethylhexyl acrylate, 33.95 kg of butyl acrylate, 1.4 kg of glycidyl methacrylate and 46.7 kg of isopropanol. After nitrogen gas had been passed through the reaction solution for 45 minutes, with stirring, the reactor was heated to 58° C. and 0.07 kg of Vazo 67™ (DuPont) in solution in 0.35 kg of acetone was added. Thereafter the external heating bath was heated to 75° C. and the reaction was carried out constantly at this external temperature. After a reaction time of 1 h 0.07 kg of Vazo 67™ (DuPont) in solution in 0.35 kg of acetone was added. After a reaction time of 2.5 h 0.091 kg of dicyclohexyl peroxydicarbonate (Perkadox 16®, Akzo Nobel) was added. After a reaction time of 24 h the polymerization was discontinued and the reaction vessel was cooled to room temperature. The polymer was analysed by test method C.

In a second free-radical polymerization a conventional 200 l reactor was charged with 0.7 kg of acrylic acid, 33.95 kg of 2-ethylhexyl acrylate, 33.95 kg of butyl acrylate, 1.4 kg of glycidyl methacrylate, 23.35 kg of special-boiling-point spirit 60/95 and 23.35 kg of acetone. After nitrogen gas had been passed through the reaction solution for 45 minutes, with stirring, the reactor was heated to 58° C. and 0.07 kg of Vazo 67™ (DuPont) in solution in 0.35 kg of acetone was added. Thereafter the external heating bath was heated to 75° C. and the reaction was carried out constantly at this external temperature. After a reaction time of 1 h 0.07 kg of Vazo 67™ (DuPont) in solution and 0.35 kg of acetone was added. After a reaction time of 2.5 h 0.091 kg of dicyclohexyl peroxydicarbonate (Perkadox 16®, Akzo Nobel) was added. After a reaction time of 3.5 h 10.50 kg of special-boiling-point spirit 60/95 were added for dilution. Further dilution took place after 7.5 h by means of the addition of 10.5 kg of special-boiling-point spirit 60/95. After a reaction time of 24 h the polymerization was discontinued and the reaction vessel was cooled to room temperature. Subsequently the two polymers were blended homogeneously with one another in a ratio of 2:3. The polymer mixture was analysed by test method C.

The polymer mixture was subsequently blended with 37.5% by weight of Sylvares TP 95 (terpene-phenolic resin with a softening temperature of 95° C.) and 0.3% by weight of $ZnCl_2$ (% by weight based in each case on the polymer) and the blend was applied from solution to a PET film, primed with Saran and 23 μm thick, and dried at 120° C. for 15 minutes. The coatweight after drying was 50 g/m².

Example 2c

A 200 l reactor convention for free-radical polymerizations was charged with 0.8 kg of acrylic acid, 38.8 kg of 2-ethylhexyl acrylate, 38.8 kg of butyl acrylate, 1.6 kg of glycidyl methacrylate, 21.54 kg of acetone and 21.54 kg of special-boiling-point spirit 60/95. After nitrogen gas had been passed through the reaction solution for 45 minutes, with stirring, the reactor was heated to 58° C. and 0.024 kg of Vazo 67™ (DuPont) in solution in 0.40 kg of acetone was added. Thereafter the external heating bath was heated to 75° C. and the reaction was carried out constantly at this external temperature. After a reaction time of 1 h 0.056 kg of Vazo 67™ (DuPont) in solution in 0.40 kg of acetone was added. After a reaction time of 1.5 h 16.0 kg of isopropanol were added.

After a polymerization time of 3.25 h 12 kg of special-boiling-point spirit 60/95 were added. After a reaction time of 5.5 h 0.12 kg of dicyclohexyl peroxydicarbonate (Perkadox 16®, Akzo Nobel) was added. After a reaction time of 6 h 12 kg of special-boiling-point spirit 60/95 were added. After a reaction time of 7 h there was a further addition of 0.12 kg of dicyclohexyl peroxydicarbonate (Perkadox 16®, Akzo Nobel). After a reaction time of 24 h the polymerization was discontinued and the reaction vessel was cooled to room temperature. The polymer was analysed by test method C.

Subsequently the polymer was blended with 37.5% by weight of Sylvares TP 95 (terepene-phenolic resin with a softening temperature of 95° C.) and 0.3% by weight of $ZnCl_2$ (% by weight based in each case on the polymer) and the blend was applied from solution to a PET film which had been primed with Saran and was 23 μm thick, and dried at 120° C. for 15 minutes. The coatweight after drying was 50 g/m$^2$.

Example 2d

A 200 l reactor convention for free-radical polymerizations was charged with 2.4 kg of acrylic acid, 38.0 kg of 2-ethylhexyl acrylate, 38.0 kg of butyl acrylate, 1.6 kg of glycidyl methacrylate, 21.54 kg of acetone and 21.54 kg of special-boiling-point spirit 60/95. After nitrogen gas had been passed through the reaction solution for 45 minutes, with stirring, the reactor was heated to 58° C. and 0.024 kg of Vazo 67™ (DuPont) in solution in 0.40 kg of acetone was added. Thereafter the external heating bath was heated to 75° C. and the reaction was carried out constantly at this external temperature. After a reaction time of 1 h 0.056 kg of Vazo 67™ (DuPont) in solution in 0.40 kg of acetone was added. After a reaction time of 1.5 h 0.24 kg of bis-2,2'-phenylethyl trithiocarbonate was added. After a reaction time of 5.5 h 0.12 kg of dicyclohexyl peroxydicarbonate (Perkadox 16®, Akzo Nobel) was added. After a reaction time of 7.5 h there was an addition of 12 kg of special-boiling-point spirit 60/95. After a reaction time of 24 h the polymerization was discontinued and the reaction vessel was cooled to room temperature.

Subsequently the polymer was blended with 37.5% by weight of Sylvares TP 95 (terepene-phenolic resin with a softening temperature of 95° C.) and 0.3% by weight of $ZnCl_2$ (% by weight based in each case on the polymer) and the blend was applied from solution to a PET film which had been primed with Saran and was 23 μm thick, and dried at 120° C. for 15 minutes. The coatweight after drying was 50 g/m$^2$.

Reference 3

In a free-radical polymerization a conventional 200 l reactor was charged with 4.9 kg of acrylic acid, 14.0 kg of methyl acrylate, 51.1 kg of 2-ethylhexyl acrylate, 23.35 kg of special-boiling-point spirit 60/95 and also 23.35 kg of acetone. After nitrogen gas had been passed through the reaction solution for 45 minutes, with stirring, the reactor was heated to 58° C. and 0.07 kg of Vazo 67™ (DuPont) in solution in 0.35 kg of acetone was added. Thereafter the external heating bath was heated to 75° C. and the reaction was carried out constantly at this external temperature. After a reaction time of 1 h 0.07 kg of Vazo 67™ (DuPont) in solution in 0.35 kg of acetone was added. After a reaction time of 2.5 h 0.091 kg of dicyclohexyl peroxydicarbonate (Perkadox 16®, Akzo Nobel) was added. After a reaction time of 3.0 h 10.50 kg of special-boiling-point spirit 60/95 were added as a diluent. Further dilution took place after 5.0 h by means of the addition of 10.5 kg of special-boiling-point spirit 60/95. After a reaction time of 24 h the polymerization was discontinued and the reaction vessel was cooled to room temperature.

Subsequently the polymer was blended with 0.4% by weight of aluminium chelate (% by weight based in each case on the polymer) and the blend was applied from solution to a PET film which had been primed with Saran and was 23 μm thick, and dried at 120° C. for 15 minutes. The coatweight after drying was 50 g/m$^2$.

Example 3a

In a free-radical polymerization a conventional 200 l reactor was charged with 4.9 kg of acrylic acid, 14.0 kg of methyl acrylate, 51.1 kg of 2-ethylhexyl acrylate and 46.7 kg of isopropanol. After nitrogen gas had been passed through the reaction solution for 45 minutes, with stirring, the reactor was heated to 58° C. and 0.07 kg of Vazo 67™ (DuPont) in solution in 0.35 kg of acetone was added. Thereafter the external heating bath was heated to 75° C. and the reaction was carried out constantly at this external temperature. After a reaction time of 1 h 0.07 kg of Vazo 67™ (DuPont) in solution in 0.35 kg of acetone was added. After a reaction time of 2.5 h 0.091 kg of dicyclohexyl peroxydicarbonate (Perkadox 16®, Akzo Nobel) was added. After a reaction time of 24 h the polymerization was discontinued and the reaction vessel was cooled to room temperature.

In a free-radical polymerization a conventional 200 l reactor was charged with 4.9 kg of acrylic acid, 14.0 kg of methyl acrylate, 51.1 kg of 2-ethylhexyl acrylate, 23.35 kg of special-boiling-point spirit 60/95 and also 23.35 kg of acetone. After nitrogen gas had been passed through the reaction solution for 45 minutes, with stirring, the reactor was heated to 58° C. and 0.07 kg of Vazo 67™ (DuPont) in solution in 0.35 kg of acetone was added. Thereafter the external heating bath was heated to 75° C. and the reaction was carried out constantly at this external temperature. After a reaction time of 1 h 0.07 kg of Vazo 67™ (DuPont) in solution in 0.35 kg of acetone was added. After a reaction time of 2.5 h 0.091 kg of dicyclohexyl peroxydicarbonate (Perkadox 16®, Akzo Nobel) was added. After a reaction time of 3.0 h 10.50 kg of special-boiling-point spirit 60/95 were added as a diluent. Further dilution took place after 5.0 h by means of the addition of 10.5 kg of special-boiling-point spirit 60/95. After a reaction time of 24 h the polymerization was discontinued and the reaction vessel was cooled to room temperature.

Subsequently the two polymers were mixed homogeneously with one another in a ratio of 1:1.

Subsequently the polymer mixture was blended with 0.4% by weight of aluminium chelate (% by weight based in each case on the polymer) and the blend was applied from solution to a PET film which had been primed with Saran and was 23 μm thick, and dried at 120° C. for 15 minutes. The coatweight after drying was 50 g/m$^2$.

Reference 4

In a free-radical polymerization a conventional 200 l reactor was charged with 4.9 kg of acrylic acid, 14.0 kg of methyl acrylate, 49.7 kg of 2-ethylhexyl acrylate, 1.4 kg of glycidyl methacrylate, 23.35 kg of special-boiling-point spirit 60/95 and also 23.35 kg of acetone. After nitrogen gas had been passed through the reaction solution for 45 minutes, with stirring, the reactor was heated to 58° C. and 0.07 kg of Vazo 67™ (DuPont) in solution in 0.35 kg of acetone was added. Thereafter the external heating bath was heated to 75° C. and the reaction was carried out constantly at this external temperature. After a reaction time of 1 h 0.07 kg of Vazo 67™

(DuPont) in solution in 0.35 kg of acetone was added. After a reaction time of 2.5 h 0.091 kg of dicyclohexyl peroxydicarbonate (Perkadox 16®, Akzo Nobel) was added. After a reaction time of 3.0 h 10.50 kg of special-boiling-point spirit 60/95 were added as a diluent. Further dilution took place after 5.0 h by means of the addition of 10.5 kg of special-boiling-point spirit 60/95. After a reaction time of 24 h the polymerization was discontinued and the reaction vessel was cooled to room temperature.

Subsequently the polymer was blended with 0.3% by weight of $ZnCl_2$ (% by weight based in each case on the polymer) and the blend was applied from solution to a PET film which had been primed with Saran and was 23 µm thick, and dried at 120° C. for 15 minutes. The coatweight after drying was 50 g/m².

Example 4a

In a free-radical polymerization a conventional 200 l reactor was charged with 4.9 kg of acrylic acid, 14.0 kg of methyl acrylate, 49.7 kg of 2-ethylhexyl acrylate, 1.4 kg of glycidyl methacrylate and 46.7 kg of isopropanol. After nitrogen gas had been passed through the reaction solution for 45 minutes, with stirring, the reactor was heated to 58° C. and 0.07 kg of Vazo 67™ (DuPont) in solution in 0.35 kg of acetone was added. Thereafter the external heating bath was heated to 75° C. and the reaction was carried out constantly at this external temperature. After a reaction time of 1 h 0.07 kg of Vazo 67™ (DuPont) in solution in 0.35 kg of acetone was added. After a reaction time of 2.5 h 0.091 kg of dicyclohexyl peroxydicarbonate (Perkadox 16®, Akzo Nobel) was added. After a reaction time of 24 h the polymerization was discontinued and the reaction vessel was cooled to room temperature.

In a free-radical polymerization a conventional 200 l reactor was charged with 4.9 kg of acrylic acid, 14.0 kg of methyl acrylate, 49.7 kg of 2-ethylhexyl acrylate, 1.4 kg of glycidyl methacrylate, 23.35 kg of special-boiling-point spirit 60/95 and also 23.35 kg of acetone. After nitrogen gas had been passed through the reaction solution for 45 minutes, with stirring, the reactor was heated to 58° C. and 0.07 kg of Vazo 67™ (DuPont) in solution in 0.35 kg of acetone was added. Thereafter the external heating bath was heated to 75° C. and the reaction was carried out constantly at this external temperature. After a reaction time of 1 h 0.07 kg of Vazo 67™ (DuPont) in solution in 0.35 kg of acetone was added. After a reaction time of 2.5 h 0.091 kg of dicyclohexyl peroxydicarbonate (Perkadox 16®, Akzo Nobel) was added. After a reaction time of 3.0 h 10.50 kg of special-boiling-point spirit 60/95 were added as a diluent. Further dilution took place after 5.0 h by means of the addition of 10.5 kg of special-boiling-point spirit 60/95. After a reaction time of 24 h the polymerization was discontinued and the reaction vessel was cooled to room temperature.

Subsequently the two polymers were mixed homogeneously with one another in a ratio of 1:1.

Subsequently the polymer mixture was blended with 0.3% by weight of $ZnCl_2$ (% by weight based in each case on the polymer) and the blend was applied from solution to a PET film which had been primed with Saran and was 23 µm thick, and dried at 120° C. for 15 minutes. The coatweight after drying was 50 g/m².

Results

Shown in Table 1 for selected examples are the results from the gel permeation chromatography.

TABLE 1

| | $M_w$ [g/mol] test D | $M_w/M_n$ test D | $M_1$ [g/mol] test D | $M_2$ [g/mol] test D |
|---|---|---|---|---|
| Reference 1 | 598 500 | 4.60 | 767 000 | — |
| Example 1a | 386 000 | 9.10 | 714 000 | 112 000 |
| Example 1b | 356 000 | 16.46 | 697 000 | 79 400 |
| Example 1c | 503 000 | 11.70 | 802 500 | 356 000 |
| Example 1d | 557 000 | 7.8 | 673 000 | 427 000 |
| Reference 2 | 3 150 000 | 32.13 | 3 450 000 | — |
| Example 2a | 973 000 | 34.01 | 2 610 000 | 84 600 |
| Example 2b | 892 000 | 56.66 | 2 830 000 | 54 700 |
| Example 2c | 943 000 | 40.49 | 708 000 | 46 700 |
| Example 2d | 723 000 | 37.31 | 951 000 | 85 600 |
| Reference 3 | 1 140 000 | 16.31 | 727 000 | — |
| Example 3a | 328 000 | 27.82 | 673 000 | 28 900 |
| Reference 4 | 1 220 000 | 24.50 | 370 000 | — |
| Example 4a | 857 000 | 31.62 | 1 134 000 | 91 300 |

$M_w$ weight-average molecular weight
$M_w/M_n$ polydispersity D
$M_1$, $M_2$ molecular weight peak in GPC for populations 1 and 2 respectively (for the monomodal reference examples the molecular weight peak is likewise designated $M_1$)

Examples 1a-b, 2a, 3a and 4a were prepared from two different polymers having different molecular weight distributions. Examples 1 c-d, 2c-d and 3b originated from one-pot polymerizations in which the regulators used were isopropanol (Examples 1c and 2c) and bis-2,2'-phenylethyl trithiocarbonate (Examples 1d, 2b and 2d). The references, in contrast, do not possess bimodal distributions.

In comparison to the references, the polymers prepared by mixing two different polyacrylates and also the polymers prepared by regulated one-pot polymerization exhibit a bimodal molar mass distribution. In all cases the polydispersity $D=M_w/M_n$ is above that of the respective corresponding reference. Examples 1a-d, 2a-c, 3a and 4a each have two peaks in GPC spectrum, the peaks being situated well apart from one another. Hence the criterion of a bimodal distribution is met.

Table 2 below lists and compares the technical adhesive properties of the individual examples.

TABLE 2

| | HP 10N, RT [min] (test A) | SAFT test 0.05 N, 30-200° C. (test B) | BS PE [N/cm] (test C) |
|---|---|---|---|
| Reference 1 | 1355 | 1000 µm/147° C. | 3.2 |
| Example 1a | 897 | 1000 µm/126° C. | 3.9 |
| Example 1b | 733 | 1000 µm/114° C. | 4.0 |
| Example 1c | 1016 | 1000 µm/129° C. | 4.0 |
| Example 1d | 1172 | 1000 µm/134° C. | 3.9 |
| Reference 2 | 3320 | 334 µm/200° C. | 3.8 |
| Example 2a | 1547 | 436/µm/200° C. | 4.8 |
| Example 2b | 1676 | 352 µm/200° C. | 4.8 |
| Example 2c | 5470 | 417 µm/200° C. | 4.7 |
| Example 2d | 7156 | 364 µm/200° C. | 4.6 |
| Reference 3 | 10000 | 1000 µm/188° C. | 0.8 |
| Example 3a | 10000 | 1000 µm/167° C. | 1.4 |
| Reference 4 | 10000 | 73 µm/200° C. | 0.9 |
| Example 4a | 10000 | 94 µm/200° C. | 1.3 |

HP: Holding power
SAFT test: Shear Adhesion Failure Temperature test
BS PE: Bond strength to polyethylene
RT: Room temperature Examples 1a-d, 2a-b, 3a and 4a in Table 2 demonstrate that, in comparison to the reference blends with the identical monomer composition and resin composition, it is possible to attain significantly higher bond strength on non-polar substrates (PE). Furthermore, a SAFT test comparison shows that good cohesion properties at elevated temperatures are ensured only by the GMA-containing PSAs (References 2 and 4, Examples 2a-c and 4a), whereas the PSAs containing only acrylic acid as a functional monomer (References 1 and 3, Examples 1a-d and 3a) achieve in all cases a shear travel of 1000 μm at well below the 200° C. limit. For References 3 and 4 and also for Examples 3a and 4a, low adhesion values on PE are recorded, since these are resin-free all-acrylate PSAs.

This invention relates to an acrylate PSA having a bimodal molar mass distribution, preferably in conjunction with at least one tackifier. It has been found that the PSA composition leads to an unexpectedly good combination of high peel adhesion and tack at room temperature, and high static shear resistance at elevated temperatures, which is suitable in particular for the use of this PSA composition for applications which involve adhesive bonding of substrates with low surface energy. Furthermore, the bimodality of the acrylate PSA of the invention also leads to very high peel adhesion on substrates which as well as low surface energies also have a high surface roughness and/or low shore A hardnesses. As compared with the prior-art PSAs. it is possible to determine a distinct increase in the bond strength, not least on non-polar substrates.

For the PSAs of the invention, particularly using GMA as a thermal reactive crosslinking substance in the sense of component (b), a particularly high temperature stability can be ascertained.

The PSA composition can be used to outstanding effect to produce a single-sided or double-sided tape or as a fastening means in products such as mechanical fastening elements.

The invention claimed is:

1. Polyacrylate having an at least bimodal molecular weight distribution, characterized by at least two maxima in the molar mass distribution curve, at points $M_1$ and $M_2$, with $M_1 > M_2$, in which there are at least two polymers, $P_1$ and $P_2$, each having their own molecular weight distribution, the polymer $P_1$ having a weight-average molecular weight in the range of from about 800,000 g/mol to 2,000,000 g/mol, and a polydispersity of between 4 to 15 and possessing a most frequent molar mass $M_{max}(P_1)$ and the polymer $P_2$ having a weight-average molecular weight in the range of from about 50,000 g/mol to 250,000 g/mol, and a polydispersity of between 1.3 to 10 and possessing a most frequent molar mass $M_{max}(P_2)$, where $M_{max}(P_1) > M_{max}(P_2)$, at least the polymer $P_1$ being based on a monomer mixture comprising (a) at least one monomer type selected from the group of the acrylic esters and of the methacrylic esters of the general formula

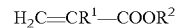

where $R^1$=H or $CH_3$ and where $R^2$ represents an aliphatic hydrocarbon chain having 4 to 15 carbon atoms;

(b) at least one olefinically unsaturated monomer type containing functional group able to react for a thermal crosslinking reaction, said functional groups selected from the group consisting of hydroxyl, epoxy, amide and isocyanate, and at least the polymer $P_1$ has copolymerized monomers of the olefinically unsaturated monomer type containing groups that are reactive for a thermal crosslinking reaction, and is capable under the influence of thermal energy of entering into a crosslinking reaction.

2. Polyacrylate according to claim 1, wherein polymers $P_1$ and $P_2$ are both based on a monomer mixture of the stated composition.

3. Polyacrylate according to claim 1 wherein the reactive groups are able to react with themselves.

4. Polyacrylate according to claim 1 wherein the monomer type (b) is glycidyl methacrylate.

5. Polyacrylate according to claim 1 wherein there are at least two olefinically unsaturated monomer types, (b1) and (b2), containing groups that are reactive for a thermal crosslinking reaction, the reactive groups of one monomer type (b1) being capable, under thermal activation, of reacting with the reactive groups of the second monomer type (b2).

6. Polyacrylate according to claim 1 wherein at least one tackifying resin has been admixed with a weight fraction of 0%-50% by weight, based on the polyacrylate.

* * * * *